(12) United States Patent
Albrecht et al.

(10) Patent No.: US 8,501,022 B2
(45) Date of Patent: *Aug. 6, 2013

(54) METHOD USING BLOCK COPOLYMERS FOR MAKING A MASTER DISK WITH RADIAL NONDATA MARKS FOR NANOIMPRINTING PATTERNED MAGNETIC RECORDING DISKS

(75) Inventors: Thomas R. Albrecht, San Jose, CA (US); Elizabeth Ann Dobisz, San Jose, CA (US); Guoliang Liu, Madison, WI (US); Ricardo Ruiz, Santa Clara, CA (US); Gabriel Zeltzer, Mountain View, CA (US)

(73) Assignee: HGST Netherlands B.V., Amsterdam (NL)

(*) Notice: Subject to any disclaimer, the term of this patent is extended or adjusted under 35 U.S.C. 154(b) by 85 days.

This patent is subject to a terminal disclaimer.

(21) Appl. No.: 13/287,761

(22) Filed: Nov. 2, 2011

(65) Prior Publication Data
US 2013/0105437 A1    May 2, 2013

(51) Int. Cl.
  *B44C 1/22* (2006.01)
(52) U.S. Cl.
  USPC ............... 216/22; 216/41; 438/694; 438/3
(58) Field of Classification Search
  USPC .................. 216/22, 41; 438/694, 3
  See application file for complete search history.

(56) References Cited

U.S. PATENT DOCUMENTS

| | | | |
|---|---|---|---|
| 7,643,234 B2 | 1/2010 | Albrecht et al. | |
| 7,920,354 B2 | 4/2011 | Pokharel et al. | |
| 7,976,715 B2 | 7/2011 | Dobisz et al. | |
| 2010/0159214 A1 | 6/2010 | Hasegawa et al. | |
| 2010/0316849 A1 | 12/2010 | Millward et al. | |
| 2011/0096436 A1 | 4/2011 | Albrecht et al. | |
| 2012/0217220 A1* | 8/2012 | Dobisz et al. ............ 216/41 |

OTHER PUBLICATIONS

Detcheverry et al., "Interpolation in the Directed Assembly or Block Copolymers on Nanopatterned Substrates: Simulation and Experiments", Macromolecules 2010, 43, 3446-3454.

Stoykovich et al., "Directed Self-Assembly of Block Copolymers for Nanolithography: Fabrication of Isolated Features and Essential Integrated Circuit Geometries", Published Online Oct. 6, 2007, www.acsnano.org.

Park et al., "Block copolymer multiple patterning integrated with conventional ArF lithography", Soft Matter, 2010,6,120-125; First published as an Advance Article on the web Sep. 17, 2009 DOI: IO.1039/b913853f.

(Continued)

*Primary Examiner* — Roberts Culbert
(74) *Attorney, Agent, or Firm* — Thomas R. Berthold

(57) ABSTRACT

A method for making a master disk for nanoimprinting patterned-media magnetic recording disks has patterns for both the data islands and the nondata regions. The method uses guided self-assembly of a block copolymer (BCP) to form patterns of generally radial lines and/or generally concentric rings as well as patterns of gap regions of one of the BCP components. The pattern of lines and/or rings have the BCP components aligned as lamellae perpendicular to the substrate, while the pattern of gap regions has the BCP components aligned as lamellae parallel to the substrate. One of the BCP components is removed, leaving the other BCP component as an etch mask to fabricate either the final master disk or two separate molds that are then used to fabricate the master disk.

23 Claims, 10 Drawing Sheets

OTHER PUBLICATIONS

Kapaklis, et al., "Nanolithographic Templates Using Diblock Copolymer Films on Chemically Heterogeneous Substrates", J. Nanoscience and Nanotechnology 2010, vol. 10. No. 9, 6056-6061.

Yang et al., "Complex self-assembled patterns using sparse commensurate templates with locally varying motifs", Nature Nanotechnology, vol. 5, Apr. 2010, 256-258.

* cited by examiner

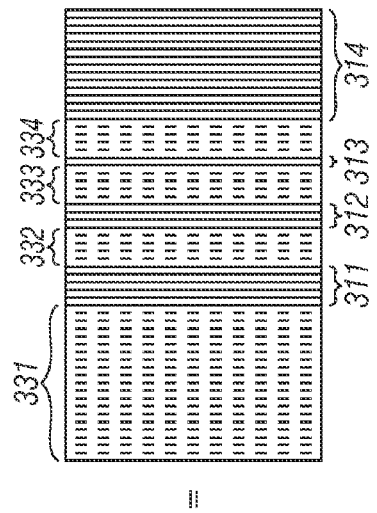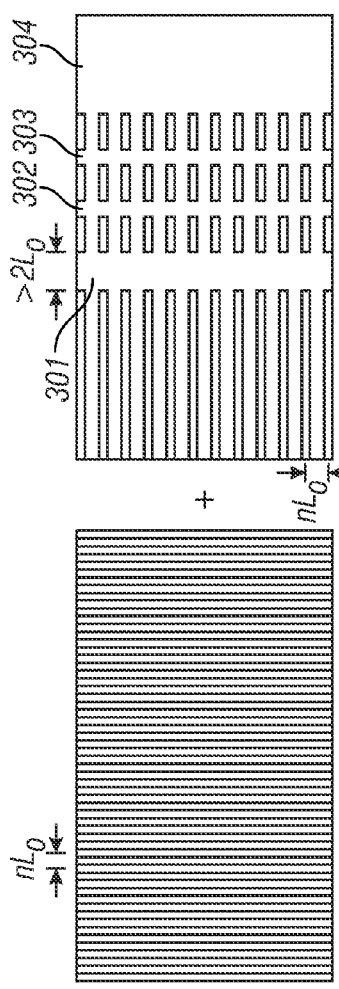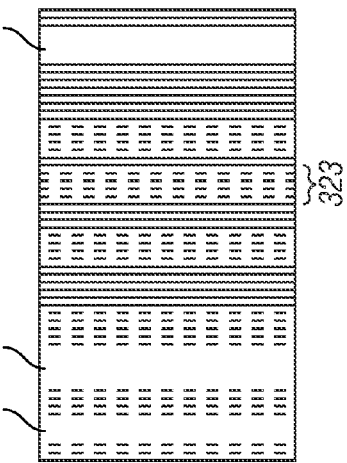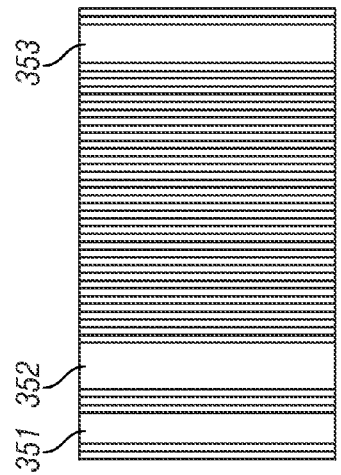

METHOD USING BLOCK COPOLYMERS FOR MAKING A MASTER DISK WITH RADIAL NONDATA MARKS FOR NANOIMPRINTING PATTERNED MAGNETIC RECORDING DISKS

BACKGROUND OF THE INVENTION

1. Field of the Invention

This invention relates generally to patterned-media magnetic recording disks, wherein each data bit is stored in a magnetically isolated data island on the disk, and more particularly to a method for making a master disk to be used for nanoimprinting the patterned-media disks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). In another type of patterned media, the magnetic material is deposited first on a flat disk substrate. The magnetic data islands are then formed by milling, etching or ion-bombarding of the area surrounding the data islands. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a template or disk, sometimes also called a "stamper", that has a topographic surface pattern. In this method the magnetic recording disk substrate with a polymer film on its surface is pressed against the template. The polymer film receives the reverse image of the template pattern and then becomes a mask for subsequent etching of the disk substrate to form the pillars on the disk. In one type of patterned media, the magnetic layer and other layers needed for the magnetic recording disk are then deposited onto the etched disk substrate and the tops of the pillars to form the patterned-media disk. In another type of patterned media, the magnetic layers and other layers needed for the magnetic recording disk are first deposited on the flat disk substrate. The polymer film used with nanoimprinting is then pressed on top of these layers. The polymer film receives the reverse image of the template pattern and then becomes a mask for subsequent milling, etching or ion-bombarding the underlying layers. The template may be a master disk for directly imprinting the disks. However, the more likely approach is to fabricate a master disk with a pattern of pillars corresponding to the pattern of pillars desired for the disks and to use this master disk to fabricate replica templates. The replica templates will thus have a pattern of recesses or holes corresponding to the pattern of pillars on the master disk. The replica templates are then used to directly imprint the disks. Nanoimprinting of patterned media is described by Bandic et al., "Patterned magnetic media: impact of nanoscale patterning on hard disk drives", *Solid State Technology S7+Suppl. S, SEPTEMBER* 2006; and by Terris et al., "TOPICAL REVIEW: Nanofabricated and self-assembled magnetic structures as data storage media", *J. Phys. D: Appl. Phys.* 38 (2005) R199-R222.

In patterned media, the bit-aspect-ratio (BAR) of the pattern or array of discrete data islands arranged in concentric tracks is the ratio of track spacing or pitch in the radial or cross-track direction to the island spacing or pitch in the circumferential or along-the-track direction. This is the same as the ratio of linear island density in bits per inch (BPI) in the along-the-track direction to the track density in tracks per inch (TPI) in the cross-track direction. The BAR is also equal to the ratio of the radial dimension of the bit cell to the circumferential dimension of the bit cell, where the data island is located within the bit cell. The bit cell includes not only the magnetic data island but also one-half of the nonmagnetic space between the data island and its immediately adjacent data islands. The data islands have a ratio of radial length to circumferential width, referred to as the island aspect ratio (JAR), that can be close to or greater than the BAR.

The making of the master template or disk is a difficult and challenging process. The use of electron beam (e-beam) lithography using a Gaussian beam rotary-stage e-beam writer is viewed as a possible method to make a master disk capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an IAR of 1, then these dimensions generally limit the areal bit density of patterned-media disks to about 500 Gbit/in$^2$. To achieve patterned-media disks with both an ultra-high areal bit density (greater than 1 Terabits/in$^2$), a track pitch and an island pitch of about 20 nm will be required. However, a master disk capable of nanoimprinting patterned-media disks with these small dimensions over an area equal to the data area of a disk may not be practical with the resolution of e-beam lithography.

Directed self-assembly of block copolymers (BCPs) has also been proposed for making the master disk and is believed capable of achieving areal bit densities of greater than 1 Terabit/in$^2$. U.S. Pat. No. 7,976,715 B2, assigned to the same assignee as this application, describes the use of directed or guided self-assembly of block copolymers to form a pattern of generally radial lines on a master disk substrate, followed by conventional lithography to form a pattern of concentric rings over the radial lines. After removal of resist and one of the block copolymer components, the substrate has a pattern of pillars of the other block copolymer component, which are then used as an etch mask to etch the substrate into a pattern for nanoimprinting disks with discrete data islands arranged in concentric data tracks.

Patterned media disks are also required to have various types of nondata regions, such as synchronization marks that are used to time the reading and/or writing of data and marks in servo sectors that are used to position and maintain the read/write head on the desired data track. These nondata regions are typically interspersed circumferentially around the data tracks and extend across multiple data tracks. However, directed self-assembly of BCPs is capable only of forming the discrete data islands arranged in repetitive patterns in concentric tracks, and is not capable of forming patterned nondata regions simultaneously with the patterned data islands.

What is needed is a master disk and a method for making it that can result in patterned-media magnetic recording disks with the required high areal bit density and with patterned nondata regions.

SUMMARY OF THE INVENTION

The invention relates to a method using directed self-assembly of BCPs for making a master disk that has the required patterns for both the data islands and the nondata regions. The master disk is used in the nanoimprinting process to make patterned-media disks that also have the required nondata regions formed at the same time as the patterned data islands.

The method uses guided self-assembly of a BCP to form patterns of generally radial lines and/or generally concentric rings as well as patterns of gap regions of one of the BCP components. The pattern of lines and/or rings have the BCP components aligned as lamellae perpendicular to the substrate, while the pattern of gap regions has the BCP components aligned as lamellae parallel to the substrate. One of the BCP components is removed, leaving the other BCP component as an etch mask to fabricate either the final master disk or two separate molds that are then used to fabricate the master disk.

The method includes depositing on a mold substrate or master disk substrate a polymeric nearly neutral layer of a material that does not show a strong wetting affinity by one of the BCP blocks over the other. The neutral layer is then covered with a resist layer and an e-beam tool patterns the resist layer so that radial or concentric stripes have a spacing or stripe pitch that is approximately an integer multiple of $L_0$ (i.e., $nL_0$), the known bulk period for the selected BCP that will be subsequently deposited. The e-beam tool also patterns the resist layer so that the gap regions have the desired gap width, which is greater than $2 L_0$. After development of the resist, the exposed neutral layer is then etched or chemically altered. The resist is removed, leaving on the substrate a pattern of radial or concentric stripes and gap regions of exposed substrate (or chemically altered neutral layer material). As a result of the patterned dimensions for the stripes and gap regions, the BCP then self assembles on the substrate (or chemically altered neutral layer material) as lamellae perpendicular to the substrate on the pattern of stripes and as lamellae parallel to the substrate on the gap regions.

For a fuller understanding of the nature and advantages of the present invention, reference should be made to the following detailed description taken together with the accompanying figures.

BRIEF DESCRIPTION OF THE DRAWING

FIGS. 8A-8C show a first example of how the two molds made by the process of this invention can be used to make a master disk with the desired pattern for both data islands and nondata radial marks.

FIGS. 9A-9C show a second example of how the two molds made by the process of this invention can be used to make a master disk with the desired pattern for both data islands and nondata radial marks.

DETAILED DESCRIPTION OF THE INVENTION

Figure 1:
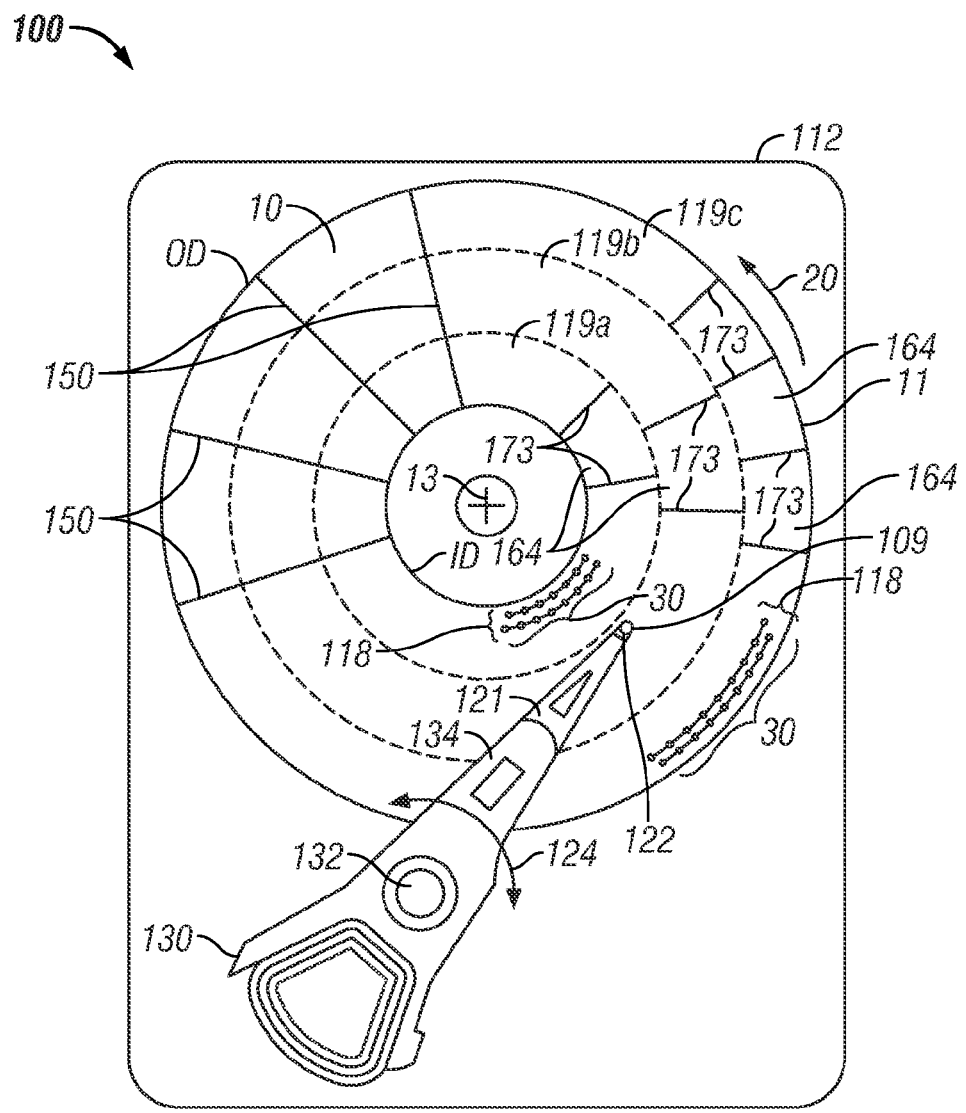
FIG. 1 is a top view of a disk drive with a patterned-media type of magnetic recording disk with generally radial nondata marks as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A read/write head 109 that includes a magnetoresistive read head and an inductive write head are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. In FIG. 1, only a few islands 30 and representative tracks 118 are shown in the inner band 119a and the outer band 119c. The grouping of the data tracks into annular zones or bands permits banded recording, wherein the angular spacing of the data islands, and thus the data rate, is different in each band. Within each band, the tracks are also circumferentially divided into a number of data fields or sectors, such as typical data sectors 164. Each data sector 164 is preceded by a synchronization (sync) field, such as typical sync fields 173. The sync fields 173 are nondata regions and are detectable by the read head for enabling synchronization of reading and writing the data bits in the data sectors 164.

As the disk 10 rotates about its center 13 in the direction of arrow 20, the movement of actuator 130 allows the read/write head on the trailing end of head carrier 122 to access different data tracks 118 on disk 10. Rotation of the actuator 130 about pivot 132 to cause the read/write head 109 on the trailing end of head carrier 122 to move from near the disk inside diameter (ID) to near the disk outside diameter (OD) will result in the read/write head making an arcuate path across the disk 10. Each data track also includes a plurality of circumferentially or angularly-spaced servo sectors 150 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 150.

The servo sectors 150 are nondata regions on the disk that are magnetized once, typically during manufacturing or formatting of the disk, and are not intended to be erased during normal operation of the disk drive.

Figure 2:
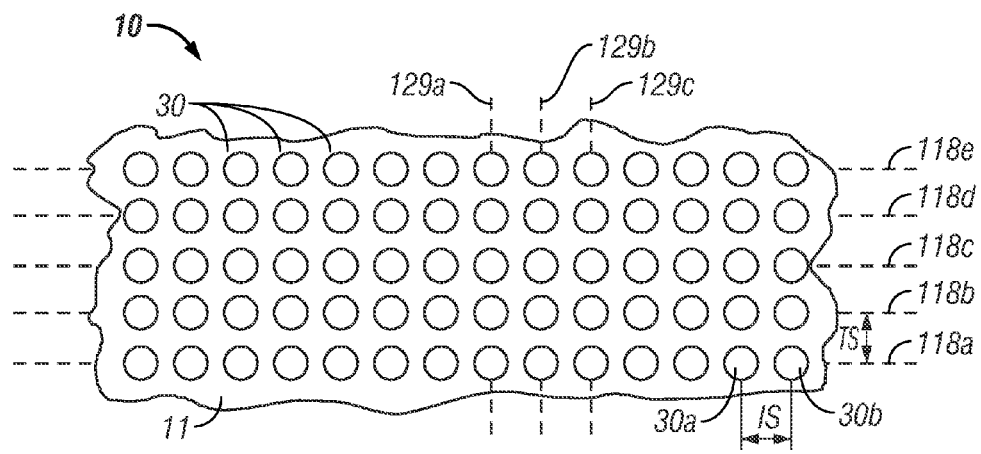
FIG. 2 is a top view of an enlarged portion of a patterned-media type of magnetic recording disk showing the detailed arrangement of the data islands in one of the bands on the surface of the disk substrate.

FIG. 2 is a top view of an enlarged portion of disk 10 showing the detailed arrangement of the data islands 30 in one of the bands on the surface of disk substrate 11 according to the prior art. While the islands 30 are shown as being circularly shaped, they may have other shapes, such as generally rectangularly or generally elliptical. The islands 30 contain magnetizable recording material and are arranged in tracks spaced-apart in the radial or cross-track direction, as shown by tracks 118a-118e. The tracks are typically spaced apart by a nearly fixed track pitch or spacing TS. Within each track 118a-118e, the islands 30 are roughly equally spaced apart by a nearly fixed along-the-track island pitch or spacing IS, as shown by typical islands 30a, 30b, where IS is the spacing between the centers of two adjacent islands in a track. In FIG. 2, TS and IS are depicted as being equal, so the bit aspect ratio (BAR) is 1. The islands 30 are also arranged into generally radial lines, as shown by radial lines 129a, 129b and 129c that extend from disk center 13 (FIG. 1). Because FIG. 2 shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

The generally radial lines (like lines 129a, 129b, 129c) may be perfectly straight radial lines but are preferably arcs or arcuate-shaped radial lines that replicate the arcuate path of the read/write head on the rotary actuator. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified.

Figure 3:
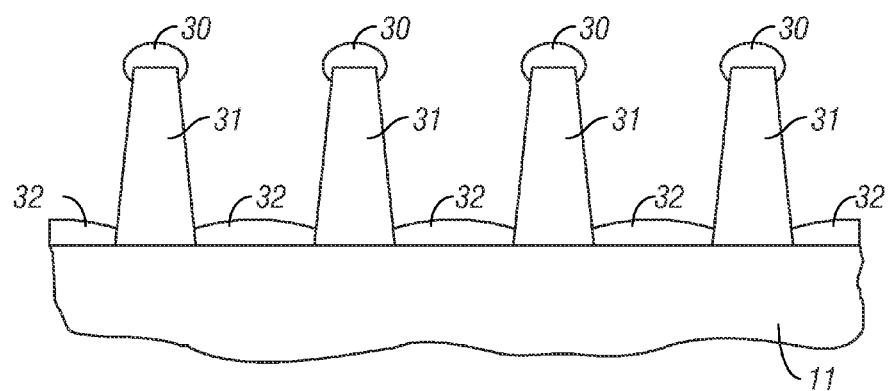
FIG. 3 is a side sectional view of one type of a patterned-media disk showing the data islands as elevated, spaced-apart pillars that extend above the disk substrate surface with trenches between the pillars.

Patterned-media disks like that shown in FIG. 2 may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume nanoimprinting process using a master template or disk. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si.

Figure 4:
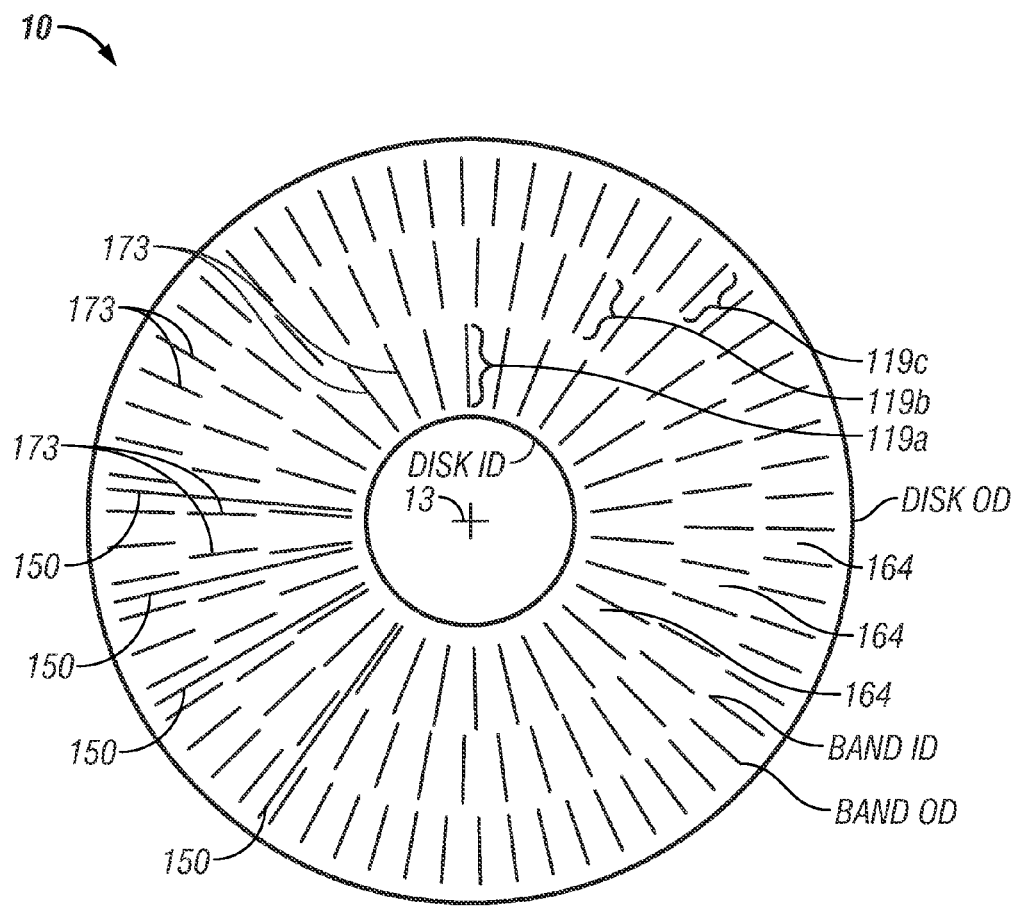
FIG. 4 is a schematic view of a patterned-media disk with patterned nondata regions in three annular bands.

FIG. 4 is a schematic view of patterned-media disk 10 with patterned nondata regions in three annular bands 119a-119c. Each band includes a large number of individual data tracks with patterned data islands (not shown). The radial lines in each band represent nondata sync fields 173 that separate the data fields or sectors 164. Thus each sync field 173 in a band extends radially across all the data tracks in its band. The circumferential density of the sync fields 173 is similar in all three bands, with the angular spacing of the sync fields 173 being adjusted in the bands to have smaller angular spacing in the direction from the disk inside diameter (ID) to outside diameter (OD). The circumferential density of the sync fields 173, and thus the "linear" or along-the-track density of data islands, stays relatively constant over all the bands on the disk. Also shown in FIG. 4 are typical nondata servo sectors 150 that extend generally radially across all the bands. The servo sectors are generally equally-angularly spaced around the disk. In actuality, a typical disk is divided into about 20 annular bands, which allows the linear bit density to remain constant to within a few percent across all bands. Each annular band, like band 119c, has a band ID and a band OD. Also, in actuality the generally radial sync fields 173 and servo sectors 150 are more typically generally arcuate lines that replicate the path of the read/write head mounted on the end of the rotary actuator.

Figure 5:
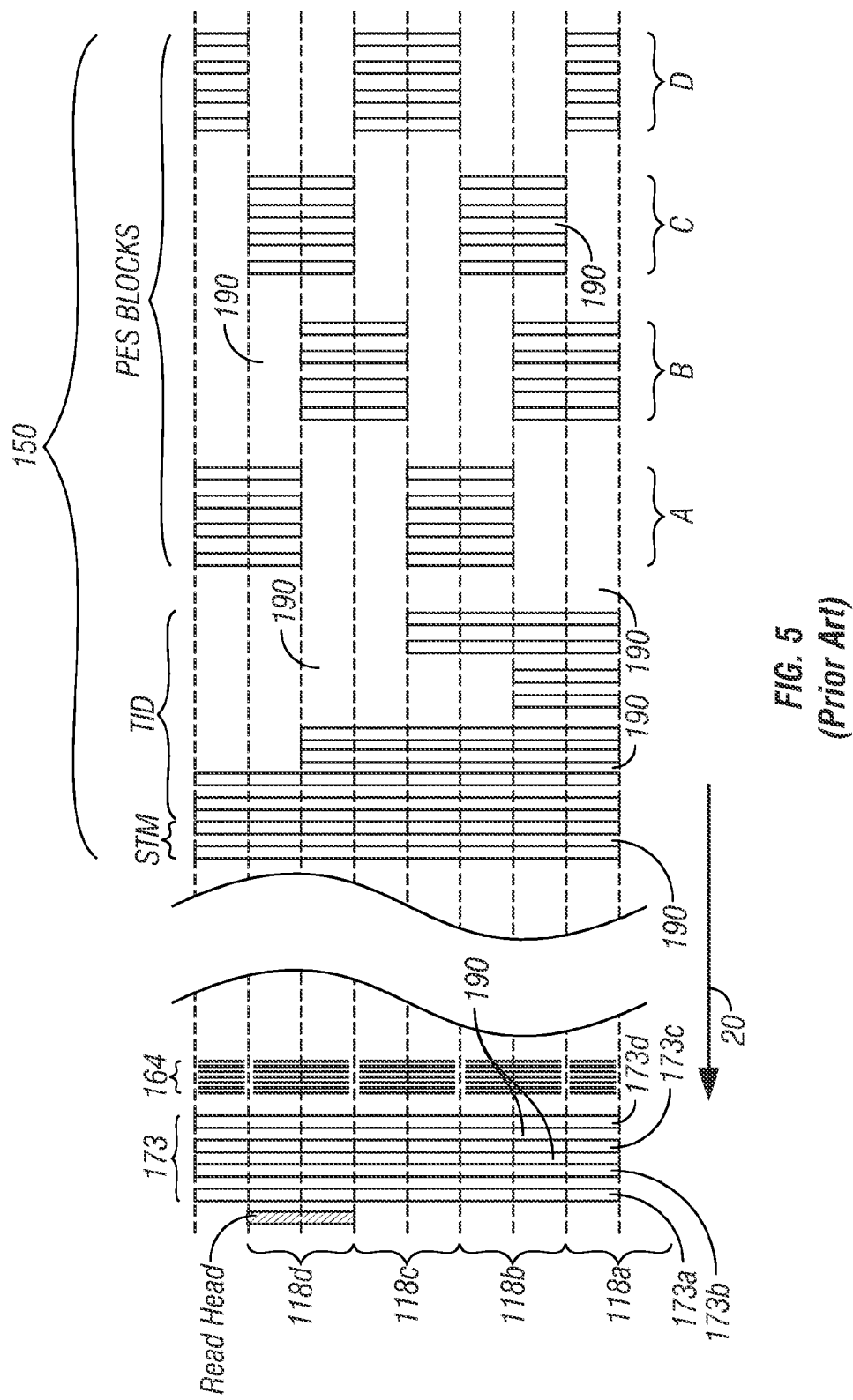
FIG. 5 is a schematic showing a portion of a patterned-media disk with a patterned nondata sync field and a patterned nondata servo sector spanning several data tracks, as proposed in the prior art.

FIG. 5 is a schematic showing a portion of a patterned-media disk with a patterned nondata sync field 173 and a patterned nondata servo sector 150 spanning several data tracks, as proposed in the prior art. Three full data tracks 118b-118d and a half-track 118a are depicted, each having a respective track centerline. The read head is shown as positioned in data track 118d and will detect the sync field 173, the data islands in data sector 164 in track 118d and the servo sector 150 as the disk rotates in the direction of arrow 20.

The sync field 173 is depicted with four individual sync marks as magnetized nondata islands 173a-173d separated by nonmagnetic spaces. The sync marks extend across the data tracks in the radial direction, resulting in a single-frequency pattern suitable for locking a phase-locked-loop data clock prior to reading or writing data bits in the data sectors 164. The sync field 173 precedes the data sector 164, which shows several data islands, represented as solid lines.

The servo sector 150 is a conventional servo pattern of the type commonly used in sector servo systems and shows a greatly simplified pattern for clarity. The servo pattern includes several fields containing nondata islands, three of which are shown as a servo-timing-mark (STM) field, a track ID (TID) field and position-error-signal (PES) field. The PES field depicted in FIG. 5 is the well-known quadrature pattern of PES islands A-D, but various other types of PES fields are known. The quadrature PES islands A-D are used to determine the fractional part of the radial position of the read head. When the read head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded in disk drive's servo electronics and used to reposition the read/write head. As shown in FIG. 5, the STM and TID extend radially across multiple data tracks, and portions of the PES typically span two data tracks.

In FIG. 5 all of the islands in sync field 173 and servo sector 150 are discrete islands of magnetic material and are magnetized in the same direction, either perpendicular to the recording layer (either into or out of the paper in FIG. 5) for perpendicular-recording media, or in the plane of the recording layer (either to the right or left in the along-the-track direction in FIG. 5) for horizontal-recording media. The islands are typically DC-magnetized by a large magnet during manufacturing. Each discrete island is a magnetized island separated from other islands by nonmagnetic spaces represented as 190. The term "nonmagnetic" means that the spaces 190 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 190 may also be the absence of magnetic material, such as grooves or troughs in the magnetic recording layer or disk substrate.

As shown schematically in FIG. 5, the nondata islands (sync field 173 and servo sector 150) have a frequency substantially lower than the data islands (data sector 164). This is because for a given resolution of the read head, a modern partial-response (PR) read channel in the disk drive's read/write electronics 113 can handle linear bit densities with a period smaller than the resolution of the read head. However, to clearly resolve individual pulses, which is beneficial for data synchronization and PES decoding, the period of the nondata islands should be close to the resolution of the read head.

The making of the master template or disk to achieve an ultrahigh density patterned-media disk is a difficult and challenging process. The use of electron beam (e-beam) lithography using a Gaussian beam rotary-stage e-beam writer is viewed as a possible method to make a master disk capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an island aspect ratio (JAR) of 1, then these dimensions generally limit the areal bit density of patterned-media disks to about 500 Gbit/in$^2$. To achieve patterned-media disks with both an ultra-high areal bit density (greater than 1 Terabits/in$^2$), a track pitch and an island pitch of about 25 nm will be required. However, a master disk capable of nanoimprinting patterned-media disks with these small dimensions over an area equal to the data area of a disk is not achievable with the resolution of e-beam lithography.

Directed self-assembly of BCPs has also been proposed for making the master disk and is believed capable of achieving areal bit densities of greater than 1 Terabit/in$^2$. U.S. Pat. No. 7,976,715 B2, assigned to the same assignee as this application, describes the use of directed self-assembly of BCPs to form a pattern of generally radial lines on a master disk substrate, followed by a pattern of concentric rings over the radial lines. After removal of resist and one of the BCP components, the substrate has a pattern of pillars of the other BCP component, which are then used as an etch mask to etch the substrate. This results in a master disk with pillars of substrate material corresponding to the desired pattern of data islands for the patterned-media disks. However, the prior art method of directed self-assembly of BCPs is not capable of simultaneously forming the patterned data islands and nondata regions that extend across multiple tracks.

The present invention relates to a method using directed self-assembly of BCPs for making a master disk that has the required patterns for both the data islands and the nondata regions. The master disk is used in the nanoimprinting process to make patterned-media disks that also have the required nondata regions formed at the same time as the patterned data islands.

The method uses guided self-assembly of a BCP to form patterns of generally radial lines and/or generally concentric rings as well as patterns of gap regions of one of the BCP components. The pattern of lines and/or rings have the BCP components aligned as lamellae perpendicular to the substrate, while the pattern of gap regions has the BCP components aligned as lamellae parallel to the substrate. One of the BCP components is removed, leaving the other BCP component as an etch mask to fabricate either the final master disk or two separate molds that are then used to fabricate the master disk.

Self-assembling BCPs have been proposed for creating periodic nanometer (nm) scale features. A self-assembling BCP typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of BCPs that can be used for forming the self-assembled periodic patterns. If one of the components A or B is selectively removable without having to remove the other, then an orderly arranged structural units of the un-removed component can be formed.

Specific examples of suitable BCPs that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the BCP are determined by the molecular volume ratio between the first and second polymeric block components A and B. When the ratio of the molecular volume of the second polymeric block component B over the molecular volume of the first polymeric block component A is less than about 80:20 but greater than about 60:40, the BCP will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the BCP will form alternating lamellae composed of the first and second polymeric block components A and B. In the present invention, the un-removed component is to be used as an etch mask, so ordered arrays of alternating lamellae and alternating cylinders are of interest.

The periodicity or bulk period ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Therefore, by adjusting the total molecular weight of the BCP of the present invention, the bulk period ($L_0$) of the repeating structural units can be selected.

To form the self-assembled periodic patterns, the BCP is first dissolved in a suitable solvent system to form a BCP solution, which is then applied onto a surface to form a thin BCP layer, followed by annealing of the thin BCP layer, which causes phase separation between the different polymeric block components contained in the BCP. The solvent system used for dissolving the BCP and forming the BCP solution may comprise any suitable non-polar solvent, including, but not limited to: toluene, propylene glycol monomethyl ether acetate (PGMEA), propylene glycol monomethyl ether (PGME), and acetone. The BCP solution can be applied to the substrate surface by any suitable techniques, including, but not limited to: spin casting, coating, spraying, ink coating, dip coating, etc. Preferably, the BCP solution is spin cast onto the substrate surface to form a thin BCP layer. After application of the thin BCP layer onto the substrate surface, the entire substrate is annealed to effectuate microphase segregation of the different block components contained by the BCP, thereby forming the periodic patterns with repeating structural units.

The BCP films in the above-described techniques self-assemble without any direction or guidance. This undirected self-assembly results in patterns with defects so it is not practical for applications that require long-range ordering, such as for making annular bands of radial lines on a master disk for nanoimprinting patterned-media disks. However, directed or guided self-assembly of a BCP to form patterns of generally radial lines and/or generally concentric rings of one of the BCP components is described in U.S. Pat. No. 7,976,715 B2, assigned to the same assignee as this application.

In a first implementation of the invention two separate molds are fabricated, one with generally radial lines and possibly also with gap regions and one with generally concentric rings and gap regions. The two molds are then used to make the master disk. The method for making each mold is explained with respect to FIGS. 6A-6J. FIGS. 6A-6C, 6E-6G and 6J are side sectional views, at various stages of the fabrication method, and FIGS. 6D, 6H and 6I are top views at various stages of the method. The method will be described in FIGS. 6A-6J for making a mold with generally radial lines and gap regions, but the method is identical for making a mold with generally concentric rings and circumferential gap regions that divide the rings into sections of rings.

Figure 6A:
FIGS. 6A-6J are views of a small portion of one annular band of a mold at successive stages of making a mold to be used in making the master disk according to the invention.

Referring first to FIG. 6A, the substrate 200 comprises a base 200, which may be formed of any suitable material, such as, but not limited to, single-crystal Si, amorphous Si, silica, quartz, silicon nitride, carbon, tantalum, molybdenum, chromium, alumina and sapphire. A nearly neutral layer 205 of a material that does not show a strong wetting affinity by one of the polymer blocks over the other, that will be referred to as "neutral layer", is deposited onto the substrate 200. The neutral layer can be, but is not restricted to, a functionalized polymer brush, a cross-linkable polymer, a functionalized polymer "A" or "B" or a functionalized random copolymer "A-r-B". The functional group may be, for example, a hydroxyl group. In the present example, the neutral layer 205 is a hydroxyl-terminated polystyrene brush of lower molecular weight than the BCP used. The brush material is spin-coated on substrate 200 to a thickness of about 1-10 nm (below 6 nm is preferred). The purpose of the neutral layer is to tune the surface energy adequately to promote the desired domain orientation (perpendicular lamellae) and to provide the adequate wetting conditions for density multiplication.

Figure 6B:
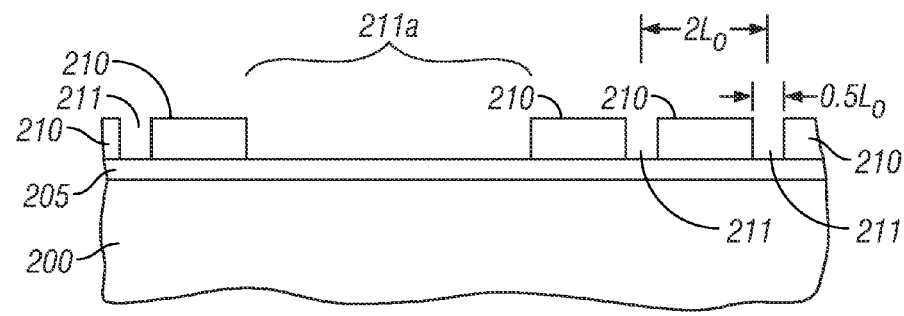

In FIG. 6B a resist layer has been deposited on neutral layer 205 and patterned into generally radial bars 210 of resist. The resist may be a positive e-beam resist like poly methyl methacrylate (PMMA) or ZEP520 from Zeon Chemicals, L.P. The resist layer is patterned by e-beam and developed to form the pattern of radial bars 210 separated by radial stripes 211 and by a radial gap region 211a that expose portions of neutral layer 205. The e-beam tool patterns the resist layer so that the radial stripes 211 have a circumferential spacing or stripe pitch that is approximately an integer multiple of $L_0$ (i.e., $nL_0$), the known bulk period for the selected BCP that will be subsequently deposited. In FIG. 6B, n is 2. The e-beam tool also patterns the resist layer so that the gap region 211a has the desired circumferential width. Only one gap region 211a is depicted, but there would typically be multiple gap regions circumferentially spaced around the substrate to help form the nondata regions in the nanoimprinted disk. The circumferential width of each radial stripe 211 is selected to be approximately 0.5 $L_0$.

Figure 6C:
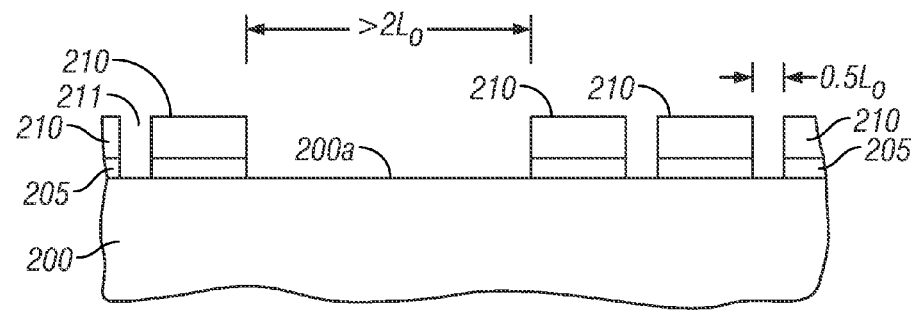
Figure 6D:
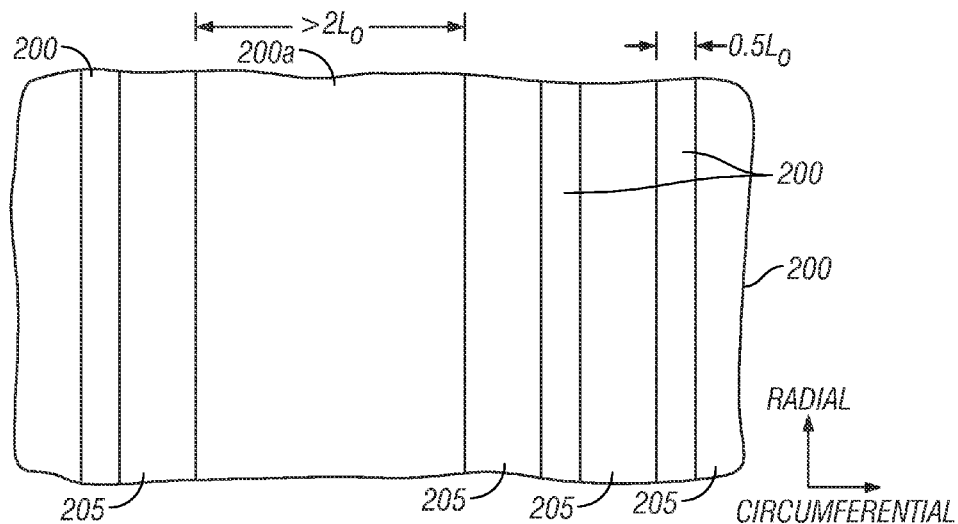

In FIG. 6C, the structure is etched, by a process of oxygen plasma reactive ion etching ($O_2$ RIE), to remove portions of neutral layer 205 in the radial stripes 211 and gap region 211a, which exposes the substrate 200. Alternatively, the chemical structure of the exposed portions of neutral layer 205 in the radial stripes 211 and gap region 211a can be chemically damaged or altered (by oxygen plasma etching or other process such as reactive ion etching, neutral atom (such as Ar) or molecule milling, ion bombardment and photodegradation) so that the exposed portions of neutral layer 205 have a preferred affinity (or repulsion) for one of the copolymers. In FIG. 6D, which is a top view, the resist 210 is removed, leaving on the substrate 200 a pattern of generally radial bars 205 of polymer brush material and generally radial stripes 200 and gap region 200a of exposed substrate (or chemically altered neutral layer material). In this pattern the generally radial stripes 200 have a circumferential width of 0.5 $L_0$ and a circumferential pitch of 2 $L_0$ and the gap region has a circumferential width greater than 2 $L_0$. Because FIG. 6D is only a very small portion of the master disk, the stripes 200 and gap region 200a appear as parallel stripes. However, the stripes 200 and gap region 200a are arranged generally radially, as depicted in FIG. 4. The stripes 200 and gap region 200a may be perfectly radially straight but are preferably arcs or arcuate-shaped so as to replicate the arcuate path of the read/write head on the rotary actuator.

Figure 6E:
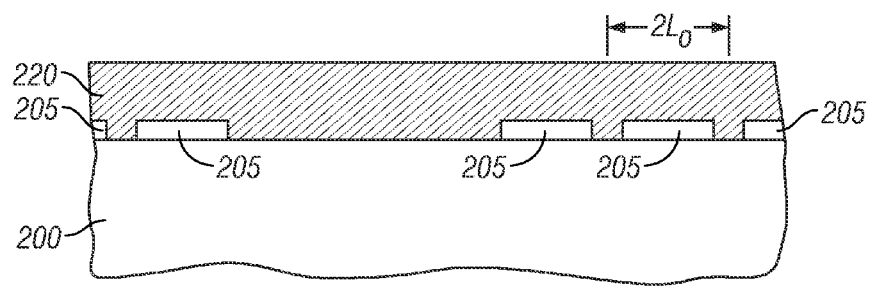

Next, in FIG. 6E, a layer 220 of BCP material is deposited over the radial bars 205 of brush material and onto the exposed substrate 200. The preferred BCP material is the lamellae-forming diblock copolymer polystyrene-block-polymethylmethacrylate (PS-b-PMMA) with $L_0$ between about 8 nm and 30 nm and is deposited by spin coating to a thickness of about 0.5 $L_0$ to 3 $L_0$.

Figure 6F:
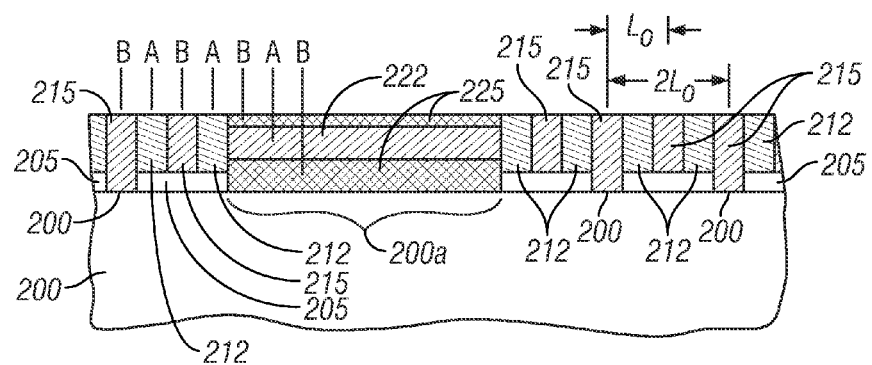

In FIG. 6F, the BCP layer has been annealed, for example by heating to about 250° C. for approximately 60 minutes under nitrogen atmosphere, which results in phase separation between the A and B components contained in the BCP. Alternatively, the BCP can be "annealed" by exposure to vapor that is the same or similar to the non-polar solvent that was used to dissolve the BCP into solution. The exposure to vapor, also called "solvent annealing", will lower the glass transition temperature Tg of the BCP layer below room temperature when exposed to the vapor. After the vapor is removed (or purged) the A and B components of the BCP will be in their final phase-separated state. In this example, the B component (PMMA) has an affinity for the substrate surface 200 (or for the polar groups of the chemically altered neutral layer material) and thus form as generally radial lines 215 on top of the radial stripes 200. Because the circumferential width of the stripes 200 is approximately 0.5 $L_0$, the A component (PS) form in adjacent radial lines 212 on the radial bars 205 of polymer brush material. As a result of the self-assembly of the A and B components this causes the B component to also form as generally radial lines 215 on the centers of each radial bar 205 of polymer brush material. The generally radial stripes 200 thus guide the self-assembly of the PS and PMMA components to form the alternating radial lines 212, 215 in the structure as shown in FIG. 6F. The A and B BCP components in the radial lines 212, 215 become arranged as lamellae perpendicular to the substrate.

Although the A and B components prefer to self-assemble in parallel lines 212, 215 with a period of $L_0$, the substrate pattern of radial stripes 200 guides the alternating lines 212, 215 to form as radial lines, which means that that $L_0$ cannot be constant over the entire radial length. However, a pattern of alternating radial lines 212, 215 can be accomplished without any significant defects if the variation from $L_0$ does not exceed approximately 10 percent. Thus, to achieve this, the circumferential spacing of the radial stripes 200 at the band ID should not be less than about 0.9 $nL_0$ and the circumferential spacing of the radial stripes 200 at the band OD should not be greater than about 1.1 $nL_0$ (n is an integer).

However, because the exposed gap region 200a of the substrate has a circumferential width greater than 2 $L_0$, the A and B BCP components cannot form as lamellae perpendicular to the substrate but instead become arranged as lamellae parallel to the substrate. This is shown in FIG. 6F with A component 222 on substrate 200 in gap region 200a, B component 225 on top of the lower A component 222, and A component 222 on top of B component 225, all oriented as lamellae parallel to the substrate.

Figure 6G:
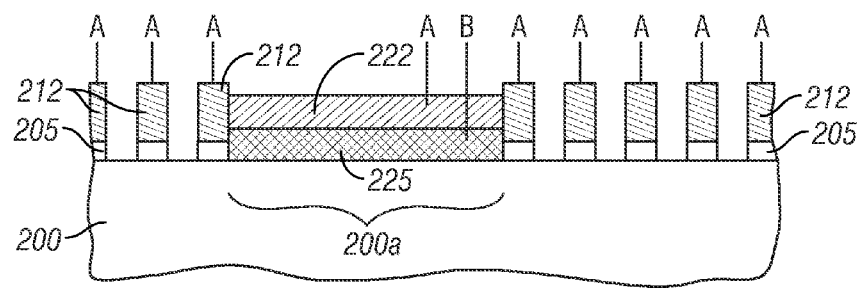
Figure 6H:
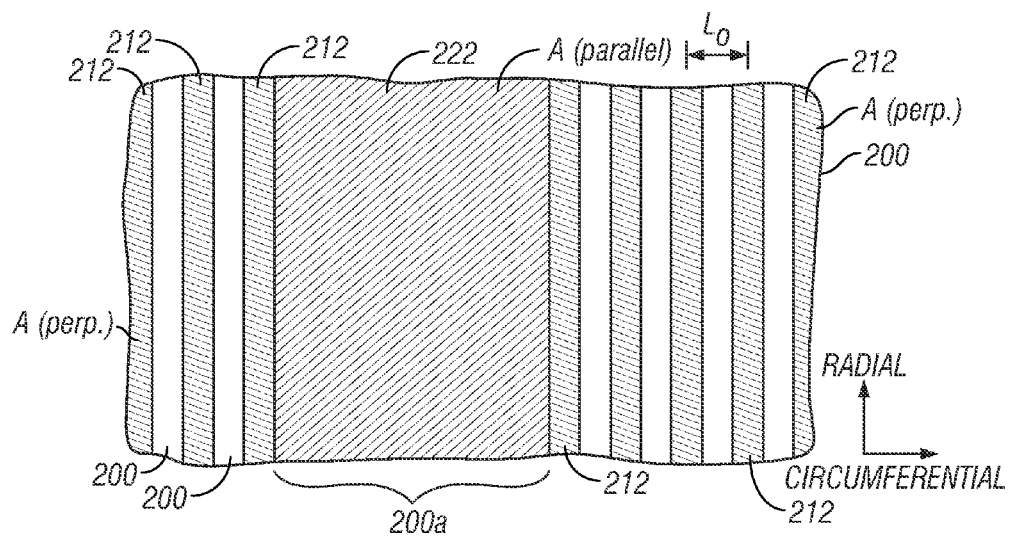
Figure 6I:
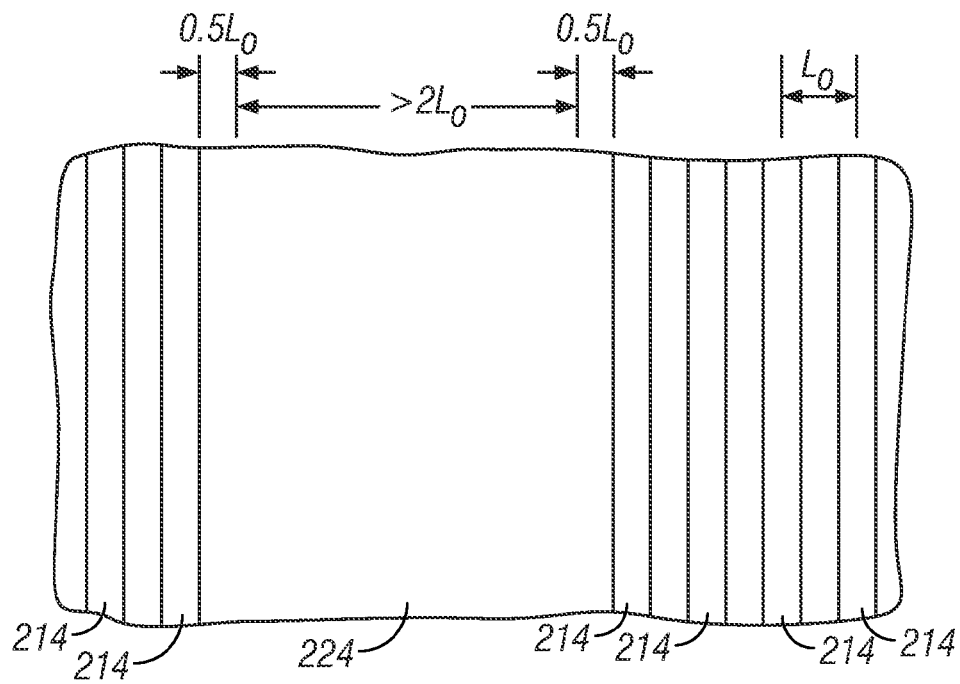

Next, in FIG. 6G, the B component (PMMA) is selectively removed by a wet etch (acetic acid, IPA or other selective solvent) or a dry etch process ($O_2$ RIE), leaving generally radial lines 212 of the A component (PS) arranged as lamellae perpendicular to the substrate and the A component 222 (and underlying B component 225) in gap region 200a arranged as a lamellae parallel to the substrate.

FIG. 6H is a top view of FIG. 6G and shows the generally radial A-component lines 212 (oriented perpendicular to the substrate) with a circumferential spacing $L_0$ and the A-component 222 (oriented parallel to the substrate) in gap region 200a. In FIG. 6H the circumferential density of radial lines 212 has been doubled from the circumferential density of radial stripes 200 in FIG. 6D. The A-component radial lines 212 and A-component 222 in gap region 200a are then used as an etch mask to etch away unprotected portions of the substrate 200.

Figure 6J:
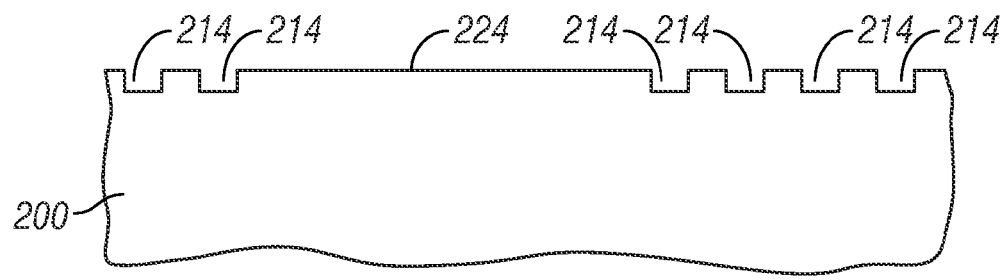

After the substrate 200 has been etched, the A-component radial lines 212 (and underlying neutral layer 205) and the A-component 222 (and underlying B-component 225) are removed by a $O_2$ RIE process or by forming gas RIE or ashing or by a wet process. The resulting structure is shown in the top view of FIG. 6I and the sectional view of FIG. 6J. The etched substrate has etched recesses 214 which are arranged as generally radial lines with a circumferential spacing $L_0$. Because the gap region 224 (and its two adjacent radial lines) were protected by the A-component etch mask, no recesses were formed in this area. The gap region 224 is now the surface of substrate 200 (as shown in FIG. 6J) with a circumferential gap width equal to the gap width of the A-component lamellae parallel to the substrate (which is greater than 2 $L_0$) plus the circumferential width of the two adjacent radial lines of the A component ($L_0$). The portions of the substrate that were protected by the A-component etch mask can be considered as substrate pillars separated by recesses, as shown in FIG. 6J. The etched substrate 200 can now function as a first mold to be used to pattern generally radial lines and gap regions in the making of the master disk.

The same process as described above with respect to FIGS. 6A-6J can be used to make the second mold to be used to pattern concentric rings and circumferential gap regions in the making of the master disk. The only difference is that in FIG. 6B the resist layer deposited on neutral layer 205 is patterned into concentric bars 210 of resist with concentric stripes 211 and circumferential gap regions 200a. An example of the patterning of the resist layer for the mold to make the concentric rings is shown in the top view of FIG. 7. The e-beam tool patterns the resist layer so that the concentric stripes 211 between the concentric bars 205 have a radial width of 0.5 $L_0$ and a radial spacing or stripe pitch that is approximately an integer multiple of $L_0$ (i.e., $nL_0$, where n=2 in FIG. 7), where $L_0$ is the known bulk period for the selected BCP that will be subsequently deposited and which may have a different value of $L_0$ from the one used in forming the radial lines. The gap region 200a separates the concentric bars 205 into circumferentially spaced sections of concentric bars.

To make the master disk using the two molds, one with the pattern of generally radial lines and the other with the pattern of generally concentric rings, the master disk substrate is covered with a protective layer and a resist layer. The master disk substrate may be formed of any suitable material, such as, but not limited to, single-crystal Si, amorphous Si, silica, quartz, silicon nitride, carbon, tantalum, molybdenum, chromium, alumina and sapphire. The protective layer may be formed of Cr, $SiO_2$, or multilayers thereof. The first mold, for example the one with radial lines (with or without gap regions), is impressed on the resist layer, and the resulting resist pattern is used as an etch mask to etch away the protective layer not covered by the resist, leaving lines of resist and underlying protective layer corresponding to the pattern of the first mold. The remaining resist is removed by a dry or wet process. The substrate is coated again with imprint resist. The second mold, the one with concentric rings and circumferential gap regions, is then impressed on the resist with the rings of the second mold intersecting the protective layer lines formed in the first pattern. The resulting resist pattern is used either as an etch mask or as a liftoff mask to form pillar-tone or hole-tone templates respectively. When used for pillar-tone, the resist pattern is used as a mask to etch away remaining portions of the protective layer not covered by the resist, leaving pillars of resist and underlying protective layer. The pillars then serve as an etch mask for an etching process that etches unprotected portions of the master disk substrate.

FIGS. 8A-8C show one example of how the two molds made by the process of this invention can be used to make a master disk with the desired pattern for both data islands and nondata radial marks, like the data sector 164, sync field 173 and servo sector 150 shown in FIG. 5. FIG. 8A shows the top view of a mold with radial lines, but no gap regions, made according to the process described in U.S. Pat. No. 7,976,715 B2, assigned to the same assignee as this application. In FIG. 8A the radial lines were formed with the neutral layer patterned such that the A and B components of the BCP formed as lamellae perpendicular to the substrate so as to form the radial lines with a circumferential spacing of $nL_0$ (where $L_0$ is the bulk period of the BCP selected for making the radial lines). FIG. 8B shows a mold with concentric rings and four circumferential gap regions 301-304 made according to the process of this invention. The gap regions 301-304 separate the concentric rings into ring sections 321-324. In FIG. 8B the concentric ring sections 321-324 were formed with the neutral layer patterned such that the A and B components of the BCP formed as lamellae perpendicular to the substrate so as to form the concentric rings with a radial spacing of $nL_0$ (where $L_0$ is the bulk period of the BCP selected for making the concentric rings and which may be different from the $L_0$ of the BCP selected for making the radial lines). However, the neutral layer was patterned in the circumferential gap regions 301-304 so as to form the A and B components of the BCP parallel to the substrates so that each of the circumferential gap regions 301-304 has a circumferential width greater than $2 L_0$. FIG. 8C shows the top view of a master disk made using the molds of FIGS. 8A and 8B. The master disk is depicted with four data fields 331-334 made up of multiple concentric data tracks with discrete data islands, and four nondata regions 311-314 that extend radially across the data tracks and are spaced circumferentially between the data fields 331-334. The nondata regions 311-314 will replicate into the nanoimprinted disks as nondata regions that extend radially across multiple data tracks and can function as sync fields and portions of servo sectors marks.

FIGS. 9A-9C show another example of how the two molds made by the process of this invention can be used to make a master disk with the desired pattern for both data islands and nondata radial marks. FIG. 9A shows the top view of a mold with radial lines and radial gap regions 351, 352, 353, made according to the process of this invention. FIG. 9B shows a mold like that in FIG. 8B, but wherein the ring section 323 is shifted radially relative to adjacent ring sections 322, 324 by $xL_0$ where $-0.5 \leq x \leq 0.5$. Thus ring section 322 is a first pattern of concentric stripes between two circumferentially-adjacent radially directed gaps 301, 302, and ring section 323 is a second pattern of concentric stripes shifted radially relative to ring section 322 between two circumferentially-adjacent radially directed gaps 302, 303. This is accomplished during the e-beam patterning process for the resist, so that after resist development the exposed neutral layer in section 323 is shifted radially. For example, given that the periodic nature of the BCP may make it difficult to realize the exact configuration of the A, B, C, D fields shown in FIG. 5, a potential alternative is to design the offset fields with offsets $xL_0$ such that $x_A=0$, $x_B=0.25$, $x_C=0.5$ and $x_D=-0.25$, respectively. Then the offset fields can be placed in the following sequence: A, B, C, D, D, C, B, A. Such a configuration may be used to extract the PES signal. FIG. 9C shows the top view of a master disk made using the molds of FIGS. 9A and 9B. The master disk is similar to the master disk of FIG. 8C except that blank regions 351, 352, 353 extend radially, and ring section 323 is shifted radially. In the disk nanoimprinted with the master disk of FIG. 9C, the blank regions 351-353 can function as radial sync fields or other nondata radial marks, and the shifted ring section 323 can function as part of a PES field. FIGS. 8A-8C and 9A-9C are just two examples of the possible types of nondata regions that can be formed on the master disk using the method of this invention wherein gap regions using BCP lamellae oriented parallel to the substrate can be formed simultaneously with radial lines and/or concentric rings using BCP lamellae oriented perpendicular to the substrate. It should be apparent that by combining the two molds with different sizes and locations of the gap regions, it is possible to form a variety of features in the nanoimprinted disks.

Figure 7:
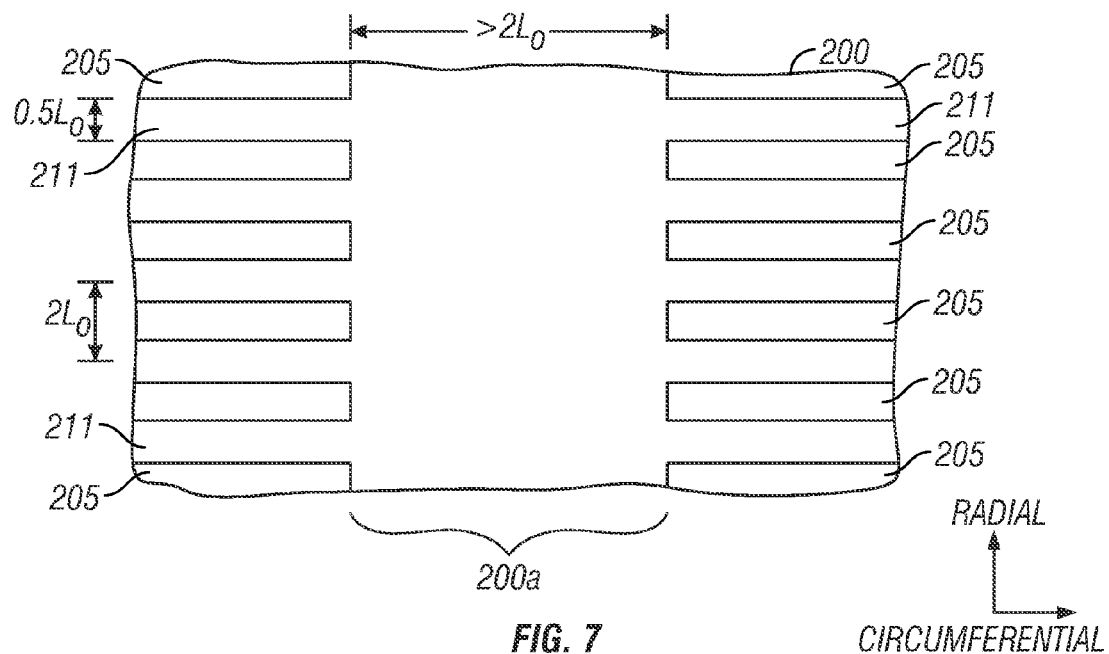
FIG. 7 is a top view showing a second mold with a neutral layer patterned by e-beam into concentric bars and gap regions, according to the invention.

In a second implementation of the method, the master disk is made directly. This method uses the method described in U.S. Pat. No. 7,976,715 B2, assigned to the same assignee as this application and which is incorporated herein by reference, but incorporates the method for making the gap regions simultaneously with the radial lines and/or concentric rings. This implementation of the method uses a first BCP material with bulk period $L_0=L_{rad}$, resulting in guided self-assembly of the first BCP into its components to multiply the generally radial stripes into generally radial lines of alternating first BCP components, and with optional formation of the first BCP components as lamellae parallel to the substrate to form optional gap regions. One of the first BCP components is removed, leaving the radial lines of the remaining first BCP component and the remaining first BCP component in the gap regions. The resulting structure is as shown in FIGS. 6G-6H. An optional protective layer is then deposited over the remaining component of the first BCP. The protective layer may be Si, $SiO_2$, alumina ($Al_2O_3$) or similar material sputter deposited to a thickness of approximately 1-2 nm. The purpose of the protective layer is to prevent movement and/or dissolving of the remaining first BCP component during subsequent processing. Then, a second neutral layer is deposited on the protective layer. A resist layer is applied over the second neutral layer and patterned by e-beam into concentric bars and gap regions, as depicted in FIG. 7. Then a second BCP with bulk period $L_0=L_{circ}$ is deposited over these concentric bars and gap regions to define generally concentric rings and gap regions. One of the components of the second BCP is removed, leaving the concentric rings of the remaining second BCP component and the remaining second BCP component in the gap regions. The concentric rings of one of the components of the second BCP are removed, leaving the concentric rings of the remaining component of the second BCP. The concentric rings rings and gap regions of the remaining second BCP component and the underlying radial lines and gap regions of the remaining first BCP component form a grid that functions as an etch mask. Etching of the substrate through this mask, followed by removal of the remaining BCP material, results in a master mold with a pattern of recesses or holes. The ratio of $L_{circ}/L_{rad}$ defines the BAR for the disk made from the master disk. If $L_{circ}=L_{rad}$ then the BAR would be 1, but the BAR can be made greater than 1 by appropriate selection of the two BCPs with different bulk ratios, $L_0$.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method using a block copolymer (BCP) for making a master disk for use in imprinting magnetic recording disks comprising:

providing a substrate;
depositing on the substrate a polymeric neutral layer;
patterning the neutral layer into a pattern of stripes and gap regions, the stripes being generally equally spaced and having a stripe pitch of approximately $nL_0$, where n is an integer equal to or greater than 2 and $L_0$ is the bulk period of the BCP, and the gap regions having a gap width greater than $2L_0$;
forming on the patterned neutral layer a BCP having a bulk period $L_0$, the BCP material being guided by the stripes to self-assemble into alternating first and second components of the BCP arranged as lamellae perpendicular to the substrate, the BCP self-assembling in the gap regions as alternating first and second components of the BCP arranged as lamellae parallel to the substrate; and removing the second component, leaving the first component on the substrate.

2. The method of claim 1 wherein the substrate is a mold substrate for making a master disk and further comprising:
   etching the mold substrate, using the first component of the BCP as a mask; and
   removing the first component of the BCP, leaving the mold substrate as a mold having a pattern corresponding to the pattern of the first component of the BCP.

3. The method of claim 2 wherein the pattern of stripes is a pattern of generally radial stripes about a center and the BCP is guided by the stripes to self-assemble into generally radial lines of alternating first and second components of the BCP, and wherein the gap regions are generally radially directed gaps and said gap widths are the circumferential widths of the radially directed gaps.

4. The method of claim 3 wherein the generally radial stripes have a generally arcuate shape.

5. The method of claim 2 wherein the pattern of stripes is a pattern of generally concentric stripes about a center and the BCP is guided by the stripes to self-assemble into generally concentric rings of alternating first and second components of the BCP, and wherein the gap regions are generally radially directed gaps and said gap widths are the circumferential widths of the radially directed gaps.

6. The method of claim 5 wherein the pattern of generally concentric stripes comprises a first pattern of concentric stripes and a second pattern of concentric stripes shifted radially relative to said first pattern of concentric stripes.

7. The method of claim 6 wherein the BCP has a bulk period $L_0$ and wherein said radial shift is $xL_0$, where $-0.5 \leq x \leq 0.5$.

8. The method of claim 1 wherein patterning the neutral layer comprises removing portions of the neutral layer to expose the substrate.

9. The method of claim 1 wherein patterning the neutral layer comprises chemically altering portions of the neutral layer.

10. The method of claim 1 wherein forming a BCP on the patterned neutral layer comprises depositing a layer of BCP and annealing the deposited BCP to cause phase separation into said first and second components.

11. The method of claim 1 wherein the BCP is a copolymer of polystyrene (PS) and poly(methyl methacrylate) (PMMA).

12. A method for making a master disk for use in imprinting magnetic recording disks comprising:
   making a first mold using the method of claim 3;
   making a second mold using the method of claim 5;
   providing a master disk substrate;
   forming a layer of resist material on the master disk substrate;
   imprinting the resist material with one of said first and second molds to form a first pattern of resist material on the master disk substrate;
   etching the master disk substrate using said first pattern as an etch mask;
   imprinting the resist material with the other of said first and second molds to form a second pattern of resist material on the master disk substrate;
   etching the master disk substrate; and
   removing the resist material.

13. A method using block copolymers (BCPs) for making a master disk for use in imprinting magnetic recording disks comprising:
   providing a substrate;
   depositing on the substrate a first polymeric neutral layer;
   patterning the first neutral layer into a first pattern of stripes generally equally spaced and having a stripe pitch of approximately $nL_{rad}$, where n is an integer equal to or greater than 2 and $L_{rad}$ is the bulk period $L_0$ of a first BCP;
   forming on the patterned first neutral layer a first BCP having a bulk period $L_{rad}$, the first BCP being guided by the first pattern of stripes to self-assemble into alternating first and second components of the first BCP as lamellae perpendicular to the substrate;
   depositing on the substrate a second polymeric neutral layer;
   patterning the second neutral layer into a second pattern of stripes generally equally spaced and having a stripe pitch of approximately $nL_{circ}$, where n is an integer equal to or greater than 2 and $L_{circ}$ is the bulk period $L_0$ of a second BCP;
   forming on the patterned second neutral layer a second BCP having a bulk period $L_{circ}$, the second BCP being guided by the second pattern of stripes to self-assemble into alternating first and second components of the second BCP as lamellae perpendicular to the substrate; and
   wherein one of said first and second patterned neutral layers includes gap regions having a gap width greater than $2 L_0$, the BCP formed on the patterned neutral layer self assembling in the gap regions as alternating first and second components of the BCP arranged as lamellae parallel to the substrate.

14. The method of claim 13 wherein the deposition and patterning of the second polymeric neutral layer and formation of the second BCP on the patterned second neutral layer are performed before the deposition and patterning of the first polymeric neutral layer and formation of the first BCP on the patterned first neutral layer.

15. The method of claim 13 wherein the first pattern of stripes is a pattern of generally radial stripes about a center and the first BCP is guided by the stripes to self-assemble into generally radial lines of alternating first and second components of the first BCP, and wherein the second pattern of stripes is a pattern of generally concentric stripes about a center and the second BCP is guided by the stripes to self-assemble into generally concentric rings of alternating first and second components of the second BCP.

16. The method of claim 15 wherein said first patterned neutral layer includes gap regions, and wherein said gap regions are generally radially directed gaps between said radial lines and said gap widths are the circumferential widths of the radially directed gaps.

17. The method of claim 15 wherein said second patterned neutral layer includes gap regions, and wherein said gap regions are generally circumferential gap regions that separate the concentric rings into ring sections and said gap widths are the circumferential widths of the circumferential gap regions.

18. The method of claim 13 further comprising, prior to depositing a second polymeric neutral layer, removing one of the first BCP components and depositing a protective layer over the other of the first BCP components.

19. The method of claim 13 wherein patterning the first neutral layer comprises removing portions of the first neutral layer to expose the substrate.

20. The method of claim 13 wherein patterning the first neutral layer comprises chemically altering portions of the first neutral layer.

21. The method of claim 13 wherein forming a first BCP on the patterned first neutral layer comprises depositing a layer of first BCP and annealing the deposited first BCP to cause phase separation into said first and second components, and wherein forming a second BCP on the patterned second neutral layer comprises depositing a layer of second BCP and annealing the deposited second BCP to cause phase separation into said first and second components.

22. The method of claim 13 wherein at least one of the first and second BCPs is a copolymer of polystyrene (PS) and poly(methyl methacrylate) (PMMA).

23. The method of claim 13 wherein $L_{circ}$ is greater than $L_{rad}$.

* * * * *